(12) United States Patent
Wu et al.

(10) Patent No.: US 11,032,332 B2
(45) Date of Patent: Jun. 8, 2021

(54) ON DEMAND ADJUSTMENT OF GROUP COMMUNICATIONS

(71) Applicant: AT&T Intellectual Property I, L.P., Atlanta, GA (US)

(72) Inventors: Michael Wu, Dublin, CA (US); Barrett Kreiner, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 73 days.

(21) Appl. No.: 15/484,942

(22) Filed: Apr. 11, 2017

(65) Prior Publication Data
US 2018/0295161 A1    Oct. 11, 2018

(51) Int. Cl.
*H04L 29/06* (2006.01)
*H04L 12/26* (2006.01)

(52) U.S. Cl.
CPC .......... *H04L 65/1083* (2013.01); *H04L 43/16* (2013.01); *H04L 65/403* (2013.01); *H04L 65/80* (2013.01)

(58) Field of Classification Search
CPC ............. H04L 65/1083; H04L 41/5009; H04L 65/403; H04L 65/80; H04L 41/5025
See application file for complete search history.

(56) References Cited

U.S. PATENT DOCUMENTS

| | | | |
|---|---|---|---|
| 9,338,096 B2 | 5/2016 | Xu et al. | |
| 9,450,817 B1 | 9/2016 | Bahadur et al. | |
| 9,497,123 B2 | 11/2016 | Basavaraja et al. | |
| 2010/0166058 A1* | 7/2010 | Perlman | A63F 13/12 375/240.02 |
| 2012/0084605 A1* | 4/2012 | Shilon | H04L 43/12 714/33 |
| 2012/0137287 A1* | 5/2012 | Pang | G06F 9/45558 718/1 |
| 2015/0169340 A1 | 6/2015 | Haddad et al. | |
| 2015/0271078 A1* | 9/2015 | Rath | H04L 47/193 370/235 |
| 2015/0375113 A1* | 12/2015 | Justice | A63F 13/355 463/42 |
| 2016/0050132 A1 | 2/2016 | Zhang | |
| 2016/0094395 A1 | 3/2016 | Hu | |
| 2016/0182280 A1 | 6/2016 | Hallivuori et al. | |
| 2016/0218917 A1 | 7/2016 | Zhang et al. | |
| 2016/0296840 A1* | 10/2016 | Kaewell | H04L 67/1002 |
| 2016/0301601 A1 | 10/2016 | Anand et al. | |
| 2016/0315781 A1 | 10/2016 | Dronadula et al. | |
| 2016/0316011 A1 | 10/2016 | Venkataraman et al. | |
| 2016/0330140 A1 | 11/2016 | Cook et al. | |
| 2016/0345185 A1 | 11/2016 | Broustis et al. | |

(Continued)

OTHER PUBLICATIONS

Chiesa et al.; "Inter-domain Networking Innovation on Steroids: Empowering IXPs with SDN Capabilities"; IEEE Communications Magazine; 54.10; 2016; p. 102-108.

(Continued)

*Primary Examiner* — Shean Tokuta
*Assistant Examiner* — Juan C Turriate Gastulo
(74) *Attorney, Agent, or Firm* — BakerHostetler

(57) ABSTRACT

A service with a plurality of communication sessions may be relocated from a first server to a second server based on performance indicators associated with the communication sessions, among other things.

20 Claims, 8 Drawing Sheets

(56) References Cited

U.S. PATENT DOCUMENTS

2018/0092028 A1\* 3/2018 Miao ................. H04W 8/08
2018/0219955 A1\* 8/2018 Chen ................ H04L 41/0896
2018/0278496 A1\* 9/2018 Kulshreshtha ........ H04L 41/145

OTHER PUBLICATIONS

Saldana et al.; "Can a Wi-Fi WLAN Suport a First Person Shooter?"; IEEE Int'l Workshop Network and Systems Support for Games (NetGames); 2015; 3 pages.

\* cited by examiner

ON DEMAND ADJUSTMENT OF GROUP COMMUNICATIONS

TECHNICAL FIELD

The technical field generally relates to communication sessions and, more specifically, to systems and methods for managing multiple communication sessions.

BACKGROUND

Connectivity for network-based traffic has multiple characteristics, including bandwidth, latency, and stability. Connectivity is typically optimized for individual connections and applications. This is desired in use cases, such as streaming a movie, downloading a file, or surfing the internet, where the content is located in a central or distributed content provider, and the characteristics of one connection generally do not impact other connections. However, this network optimization may lead to a poor experience for use cases involving a group of connections, and when the content is time sensitive, such as sporting events or stock trading, or interactive, such as online multiplayer gaming or video conferencing.

SUMMARY

Disclosed herein is system in which the characteristics of a plurality of communication connections for a given virtual service may be collected and analyzed to identify a target set of characteristics to provide the most equitable characteristics to each connection for a virtual service.

When the characteristics of the connectivity of one or more members of the group are significantly different than the others, due to physical transport, network topology, or physical geography, the experience is degraded for the user(s) of that connection, and the other connections are also impacted. It would be preferred that the characteristics of the individual connections be equalized as much as possible without introducing any specific penalties on the experience, so that each connection within a group receive approximately the same experience. Services are now offered from virtual instances, where the software providing the service is portable across multiple systems and the containing environment can be relocated from one physical system to another, allowing the service provider software to relocate to a more appropriate host.

A process may include identifying one or more hosts compatible with a virtual service provider that are approximate to the desired equitable characteristics for the connections and capable of hosting the virtual service. The environment for the virtual service (e.g., virtual machine) may be relocated (or another virtual service may be instantiated) from the current host to an identified target host.

There may be an iterative process to collect statistics on the performance of the virtual service provider on the new host or other changes to the group connection. Changes such as adding new connections, removing new connections, or significant change in performance (or other characteristics) of the connection may be monitored and used to invoke multiple move processes, until such time that the group's connections are all terminated.

In an example, a network device may include a processor and a memory coupled with the processor that effectuates operations. The operations may include receiving a plurality of performance indicators associated with a plurality of communication sessions between the network device and a plurality of devices, wherein the plurality of communication sessions are with a virtual machine on the network device; based on the plurality of performance indicators, obtaining a plurality of alternate performance indicators for an alternate network device; and based on the plurality of alternate performance indicators, transferring the virtual machine to the alternate network device.

In another example, a network device may include a processor and a memory coupled with the processor that effectuates operations. The operations may include receiving a plurality of performance indicators associated with a plurality of communication sessions between the network device and a plurality of devices, wherein the plurality of communication sessions are with a virtual machine on the network device; based on a performance indicator of the plurality of performance indicators being outside of a threshold, comparing performance indicators of a group of the plurality of communication sessions associated with the plurality of devices; and determining an alternate network device at which to instantiate the virtual machine based on the comparison such that the group of the plurality of communication sessions are substantially equalized.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Online multiplayer gaming is an example of a virtual service (e.g., cloud service) in which having near equivalent connection condition characteristics may provide a preferred experience for players involved in the multiplayer game. Another example is when two or more users of a plurality of mobile devices want to share an experience by watching the same content at the same time from a plurality of locations. The disclosed process to analyze current network conditions or historic network conditions may help determine the best location for a network element (e.g., a router, switch, virtual machine, etc.) to be instantiated where the connectivity characteristics (e.g., performance or other characteristics) to this network element from each participant of a shared experience is near-equivalent. Additionally, as new participants are added to the group experience (e.g., device 103), the process may determine a new optimal location for the entire group and "move" the network element for the whole group to the new optimal location.

Figure 1:
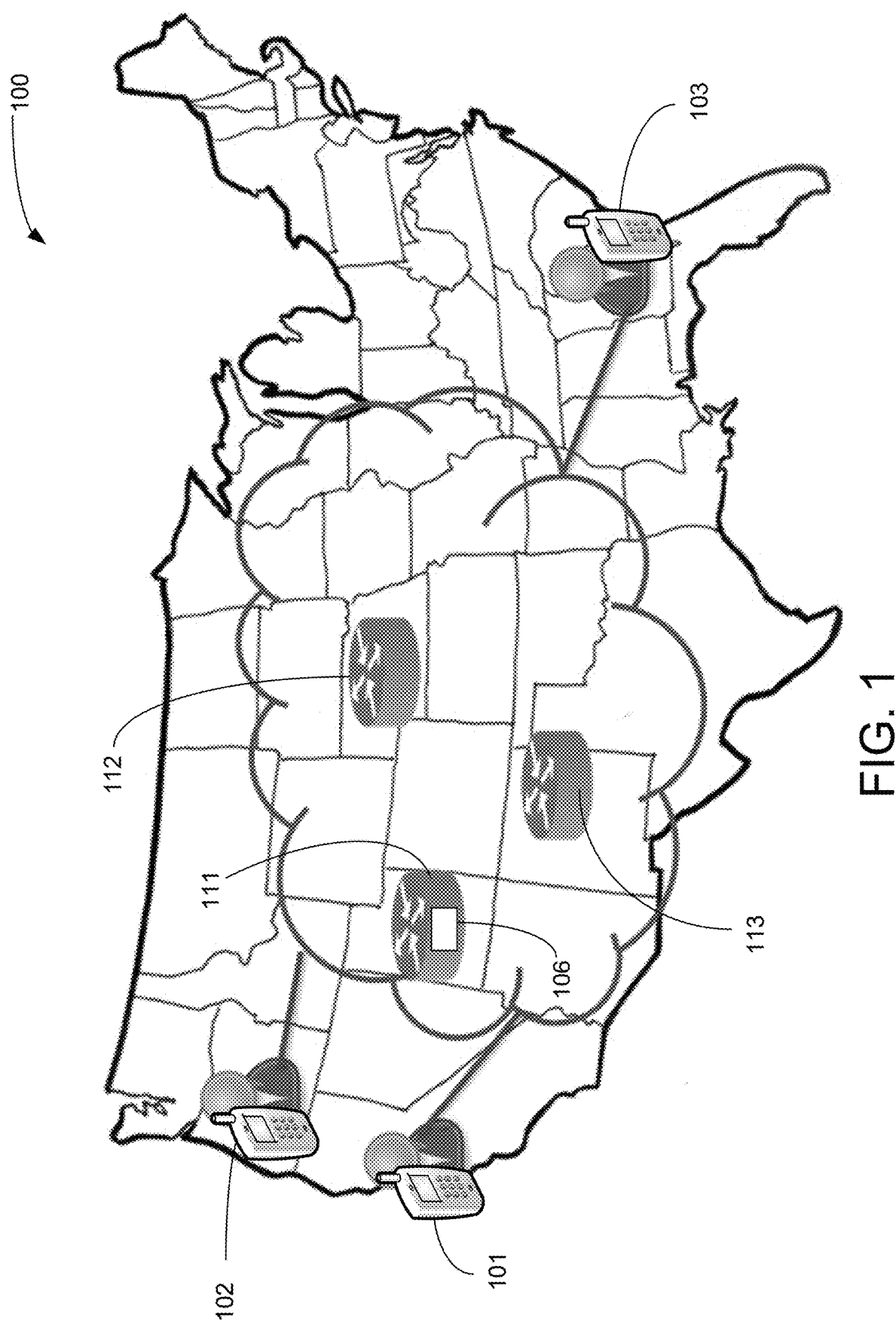
FIG. 1 illustrates an exemplary system 100 for on demand adjustment of group communication.

FIG. 1 illustrates an exemplary system 100 for on demand adjustment of group communication. Device 101, device 102, or device 103 may be communicatively connected with any one of a number of network devices (e.g., servers), such as network device 111, network device 112, or network device 113, that may be located in different geographical locations. Network device 111, network device 112, or network device 113 may be dedicated servers for a particular service (e.g., online gaming or streaming media) or may be software defined computing device that includes a hypervisor for creating one or more virtual machines, such as virtual machine 106. Many of the examples below are presented in the gaming context, but other scenarios, such as streaming multimedia (e.g., simultaneous movie or television) are contemplated herein.

Figure 2:
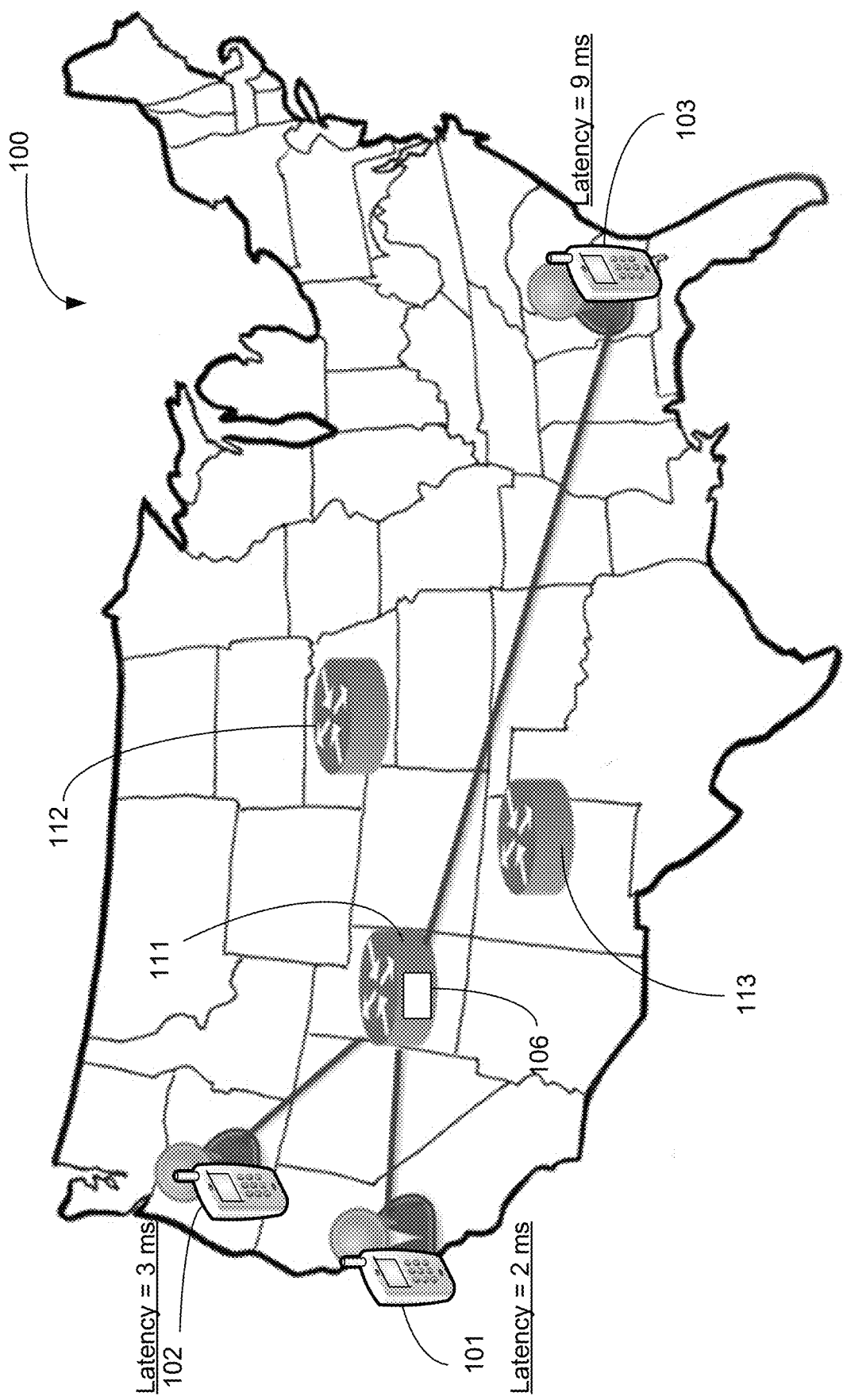
FIG. 2 illustrates an exemplary system for on demand adjustment of group communication.

FIG. 2 illustrates an exemplary system 100 that may implement on demand adjustment of group communication. Network device 111 may have a communication session with device 101, device 102, and device 103. In a first scenario, users of device 101, device 102, and device 103 may play an online interactive game (e.g., a online sports game) via virtual machine 106 of network device 111. Virtual machine 106, which resides on network device 111, may provide the gaming instance of the online sports game. At the beginning of interactive gameplay, there may have been just two devices (e.g., device 101 and device 102) within the gaming instance. As shown, the latency for device 102 is 3 milliseconds (ms) and the latency for device 101 is 2 ms, which may be an acceptable threshold for gameplay. At some time later, user of device 103 may join the user's friends (users of device 101 and device 102) in this gaming instance. In this first scenario, the latency for the connection between device 103 and network device 111 is 9 ms. This 9 ms latency may have been the initial latency or latency that occurred as a result of network congestion. The network congestion may be based on time of day usage patterns, a network outage of some sort, or the like.

Figure 3:
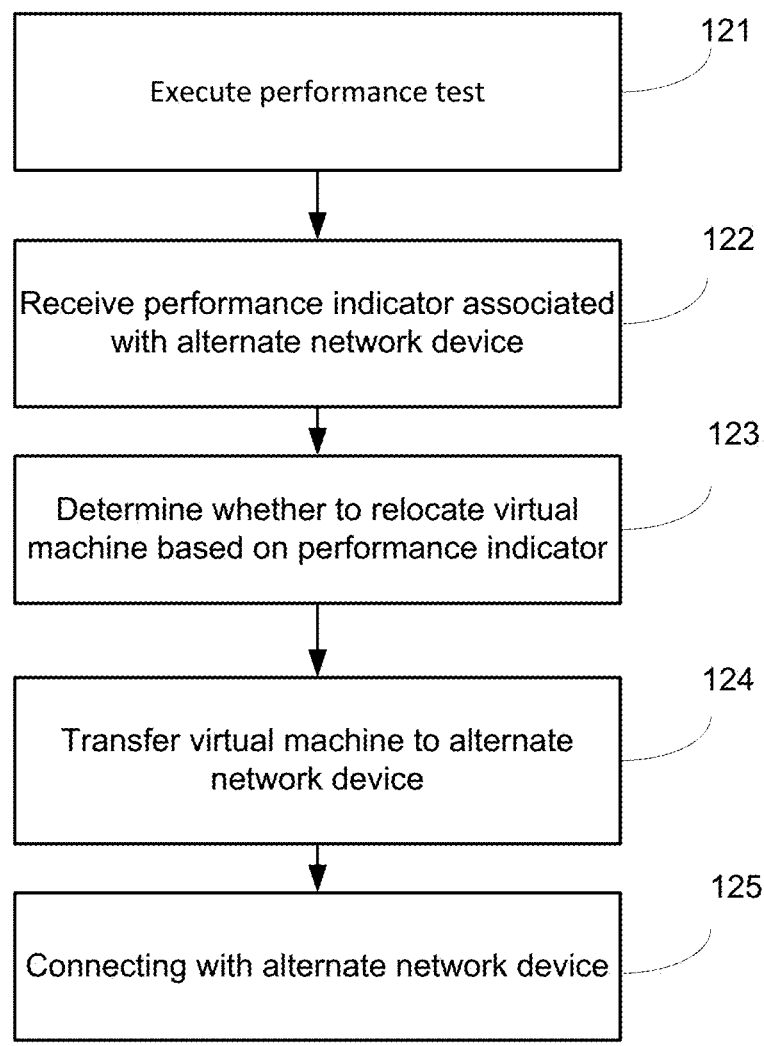
FIG. 3 illustrates an exemplary method for on demand adjustment of group communication.

FIG. 3 illustrates an exemplary method for on demand adjustment of group communication, which may be executed on network device 111 or another computing device. At step 121, with reference to the first scenario, a performance test may be executed for the connections between a device (e.g., device 101, device 102, or device 103) and network device 111. This performance test may (or may not) try to simulate messages that occur during actual gameplay (e.g., sourced from virtual machine 106 or use a similar packet length as gameplay messages). The performance test may be a simple ping or the like. The performance test may output performance indicators that are based on or include network latency, processor speed of any device or network device, battery performance of any device or network device, cost (financial) of a communication session (s), reliability, or lag, among other things. The performance indicators may include mean or median of the total of a type of performance indicator (e.g., mean latency or median processor speed).

At step 122, a performance indicator associated with alternate network device (e.g., network device 112 or network device 113) may be obtained by network device 111.

In a first example, network device 111 may periodically obtain performance indicators of network device 112 or network device 113. In a second example, network device 111 may obtain the performance indicator associated with network device 112 or network device 113 because of performance issues occurring with the gameplay. In this second example, when a performance indicator associated with network device 113 reaches a threshold (e.g., difference of 40% latency between one or more connections), network device 111 may provide instructions to network device 112 to execute a performance test that includes testing connections between network device 112 and device 101, 102, or 103. In a third example, network device 111 may broadcast, multicast, or otherwise provide instructions to network device 112, network device 113, or another appropriate network device to communicate with network device 111 when a performance indicator is within a threshold number.

Figure 4:
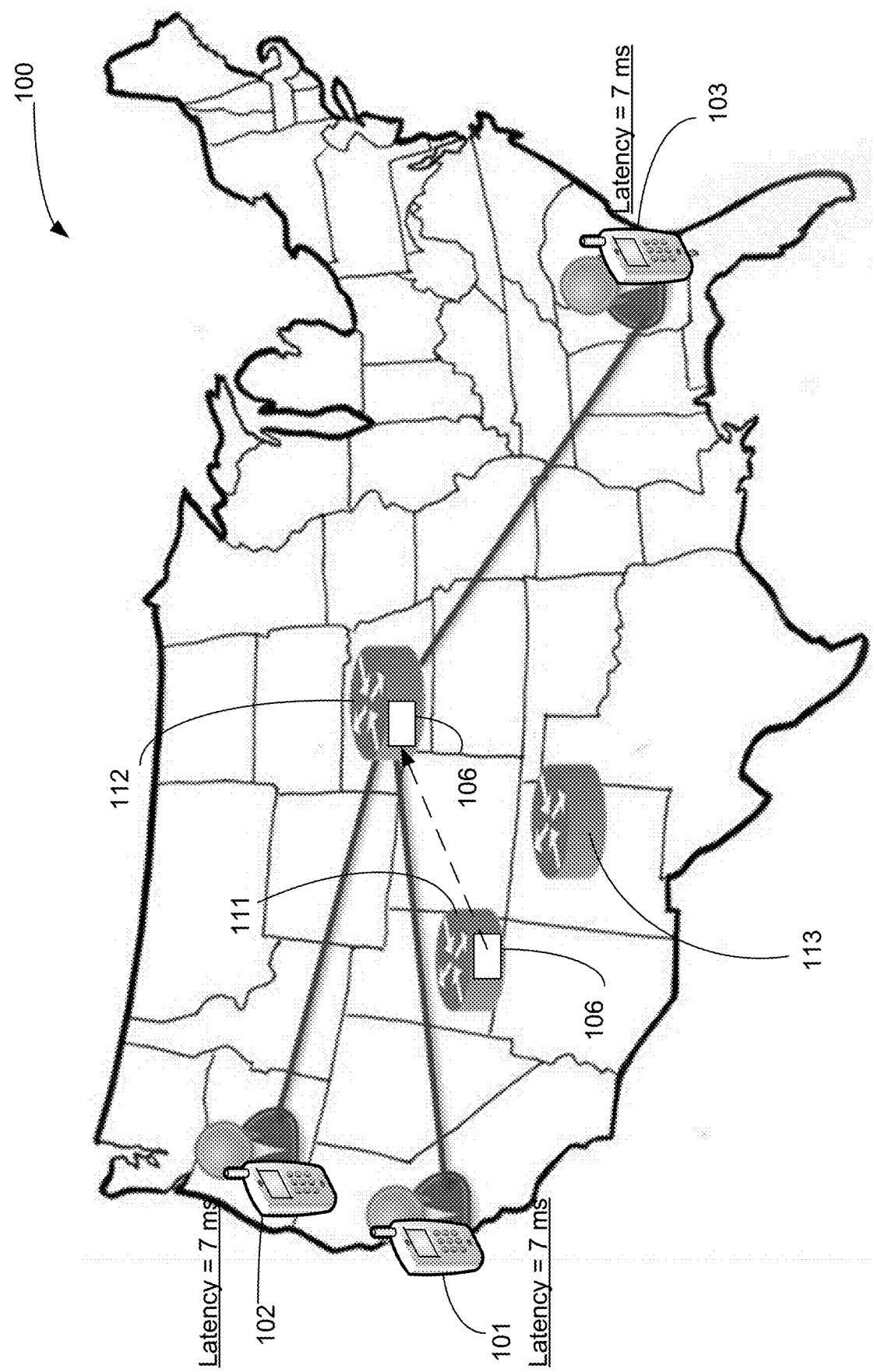
FIG. 4 illustrates an exemplary system for on demand adjustment of group communication.

With continued reference to FIG. 3, at step 123, based on the performance indicator associated with network device 112, a determination may be made to relocate (e.g., move) the gameplay instance (e.g., virtual machine 106) on network device 111 to network device 112 (see FIG. 4). The determination to relocate virtual machine 106 may be based on the performance indicator associated with network device 112 being within a threshold value. The threshold may be an acceptable threshold that provides better performance, such as lower average latency, lag, or other performance indicator associated with the network devices or communication sessions. For example, the threshold may be 7 ms of latency or less between device 101, device 102, or device 103 and the next network device (e.g., network device 112 or network device 113). To expand on the example, the threshold may be a predetermined range for preferred communication session (or device) performance (e.g., 1 ms-7 ms of latency for each communication session or on average across the communication session), the threshold may be the best performance indicators (e.g., lowest latency or highest throughput) associated with a plurality of possible alternate network devices, or the like. The performance indicator may be one number (e.g., 7 ms of latency) or a combination of numbers (e.g., latency, lag, processing speed, memory availability, etc.). It is contemplated herein that any appropriate combination of the examples disclosed herein may be implemented.

At step 124, based on the determination of step 123, virtual machine 106 is copied or otherwise transferred to network device 112 (e.g., copy the image of virtual machine 106). For example, first the virtual machine 106 of network device 111 may be copied onto network device 112, while a copy stays on network device 111. The copy of virtual machine 106 on network device 112 may be inactive (e.g., not connected to device 101, device 102, or device 103). Next, the virtual machine 106 may be deactivated on network device 111 and then automatically activated on network device 112. It is contemplated herein that virtual machine 106 may not be copied, but information associated with gameplay, for example, may be appropriately transferred over in a way that enables a similar gameplay instance. At step 125, device 101, device 102, and device 103 are connected with virtual machine 106 on network device 112, based on rerouting from network device 111 to network device 112. There may be a pause in gameplay (e.g., suspension of an image of the instance) in order to update the copied virtual machine 106 on network device 112 with gameplay information that was created between the creation of the copy of virtual machine 106 on network device 112 and the deactivation of virtual machine 106 that resided on network device 111. As shown in FIG. 4, device 101, device 102, and device 103 have similar latency levels of 7 ms to network device 112 after the transfer and activation of virtual machine 106.

Figure 5:
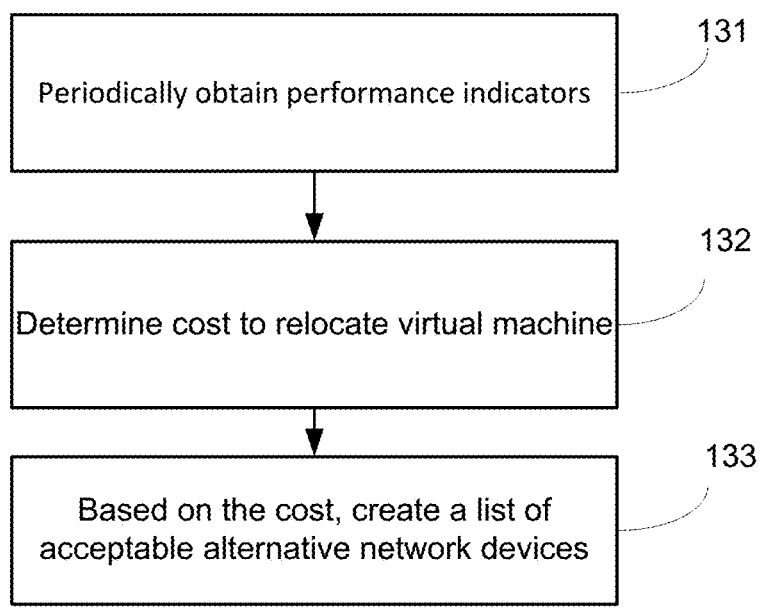
FIG. 5 illustrates another exemplary method for on demand adjustment of group communication.

FIG. 5 illustrates another exemplary method for on demand adjustment of group communication. At step 131, performance indicators and other information may be obtained periodically. For example, every 5 minutes during a gameplay instance, network device 111 may perform performance tests and obtain the current performance indicators of virtual machine 106 when it is active on network device 111. In addition, current or past performance indicators of other devices (e.g., device 101, device 102, device 103, network devices, or intermediate nodes (not shown)) may be obtained.

At step 132, based on the current performance indicators, past performance indicators, or other information, a cost to move virtual machine 106 from network device 111 to network device 112, network device 113, or another network device, may be determined. In an example, the cost to move may be based on an anticipated performance of virtual machine 106 when moved as well as the detriment to other virtual machines (e.g., game play instances) during a particular time of day (e.g., Wednesday at 6 pm). Although the current performance indicators may be okay at the current time (e.g., Wednesday at 5:45 pm), a move may not be worth it, since the performance indicators at the 6 pm hour is usually not within a required threshold for network device 113, for example.

With continued reference to FIG. 5, at step 133, based on the cost to move virtual machine 106 being within an acceptable threshold, a list of acceptable network devices and their corresponding performance indicators may be provided to network device 111. This list of acceptable network devices may be periodically updated for whenever a change of network devices is required based on certain triggers associated with threshold performance indicators being met, a number of users being added, or a request associated with a user of device 101, for example.

It is contemplated herein that instead of moving the gameplay instance from network device 111 to network device 112, for example, latency may be introduced by network device 111. For example, network device 111, with reference to FIG. 2, may introduce latency so that the communication session between virtual machine 106 and device 101, device, 102, and device 103 may be approximately 9 ms of latency. In another example scenario, the cost (e.g., comparison of performance indicators in view of moving or not moving) of one of the following may be determined: 1) moving virtual machine 106 alone; 2) injecting delay alone; or 3) a combination of moving the virtual machine and injecting delay. Therefore there may be a scenario wherein virtual machine 106 may be moved from network device 111 to network device 112 and a delay injected after consideration of performance indicators, costs to move virtual machine 106, or the like. In this scenario, the connection associated with device 103 may be reduced to 5 ms if virtual machine 106 is moved to network device 113 and device 101 or device 102 remain at 2 ms and 3 ms, respectively. Alternatively, if virtual machine 106 is moved to device 112, then the connections (i.e., communication sessions) associated with device 101, device 102, and device 103 may all be 7 ms. In this scenario, it may be beneficial to add latency to the 2 ms and 3 ms time via the processor of network device 113. With that said, adding latency (delay) may put too much load on the processor of network device 103 and may negatively affect other virtual machines on network device 103, which may be a reason to move to network device 112 with the 7 ms of latency.

As disclosed herein, device 101, device 102, or device 103 may be a computing device, such as mobile phone, laptop, desktop computer, tablet computer, or the like. Network device 111, network device 112, or network device 113 may be "white box" computing devices that may be software defined. The logical functions disclosed herein (e.g., FIG. 3 or FIG. 5) may be executed on one device (e.g., network device 111 or device 101) or distributed across a plurality of devices. Although gameplay is disclosed herein, the methods and systems may apply to internet telephony or streaming media, such as movies and live TV, among other things. For example, a group may subscribe to watch the same video feed for a football game. Therefore they may be connected through the same network device 112, which has a similar delay. Because of the disclosed subject matter, this group may comment about the football game (e.g., via video or text) in a way that there is no perceived lag and supports interactive experience for streaming multimedia. The system disclosed herein may be used for voice over internet protocol telephony (VoIP) and real-time video telephony (e.g., 3-way video teleconference). In an example, for conference calls, a virtual private branch exchange (e.g., virtual machine 106) may be moved to different network devices based on the methods and systems disclosed herein. Instead of sending everyone to their own server with potentially significantly asymmetrical different times (e.g., lag), the best "one" server may be selected. In another example, the system may be used for interactive real-time video fitness (e.g., cycling or yoga). For example, a centrally located trainer may give a live training session and based on the performance indicators associated with the plurality of communications sessions (e.g., the individual class member connections); virtual machine 106 may be appropriately relocated to an alternate network device. Because of the seemingly real-time feedback the training session may be more interactive with the training session participants. Real-time may be considered to be within 200 ms or the typical time for acceptable interactive performance of voice telephony.

In summary, disclosed herein is a system in which the characteristics of a plurality of communication connections for a given virtual service may be collected and analyzed to identify a target set of characteristics to provide the most equitable characteristics to each connection for a virtual service. A process may include identifying one or more hosts compatible with a virtual service provider that are approximate to the desired equitable characteristics for the connections and capable of hosting the virtual service. The environment for the virtual service (e.g., virtual machine) may be relocated (or another virtual service may be instantiated) from the current host to an identified target host. There may be an iterative process to collect statistics on the performance of the virtual service provider on the new host or other changes to the group connection. Changes such as adding new connections, removing new connections, or significant changes in performance (or other characteristics) of the connection may be monitored and used to invoke multiple move processes. This iterative process may be stopped based on when the connections are terminated. There may be a comparison of the communication sessions for a group of users associated with the plurality of devices, and a location determined at which to instantiate a virtual machine based on the comparison such that the sessions are substantially equalized.

Figure 6:
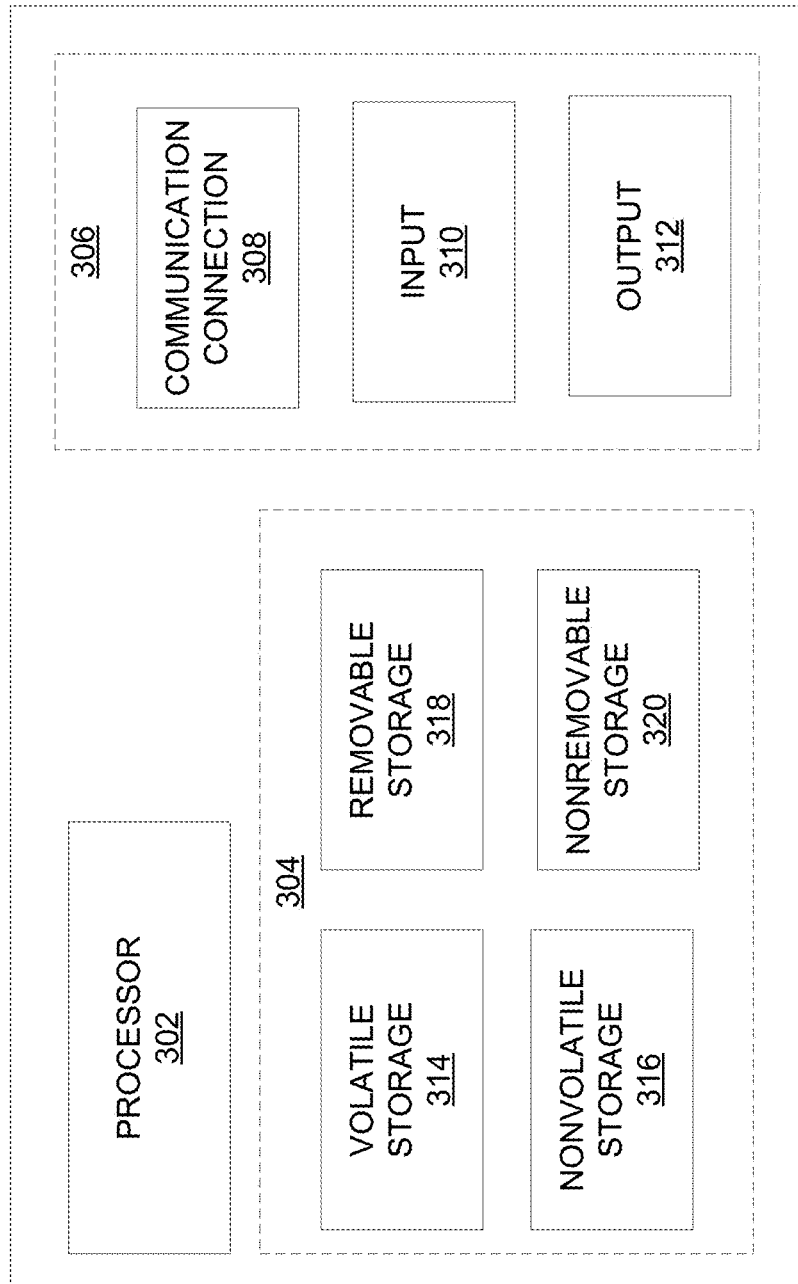
FIG. 6 illustrates a schematic of an exemplary network device.

FIG. 6 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300, depicted in FIG. 6, may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
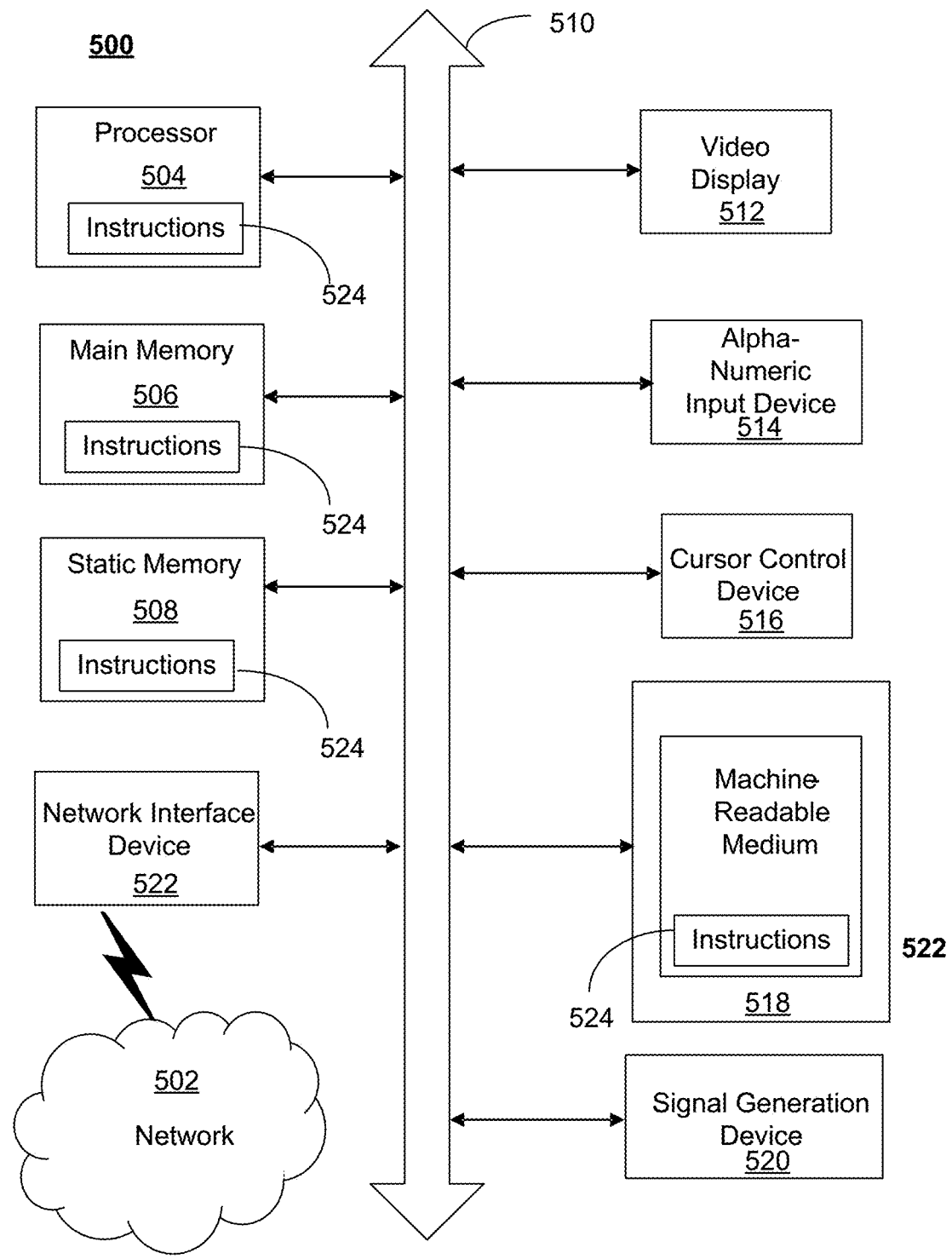
FIG. 7 illustrates an exemplary communication system that provides wireless telecommunication services over wireless communication networks.

FIG. 7 depicts an exemplary diagrammatic representation of a machine in the form of a computer system 500 within which a set of instructions, when executed, may cause the machine to perform any one or more of the methods described above. One or more instances of the machine can operate, for example, as processor 302, network device 111, network device 113, device 101, device 102, and other devices of FIG. 1 and FIG. ZZ2. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 8:
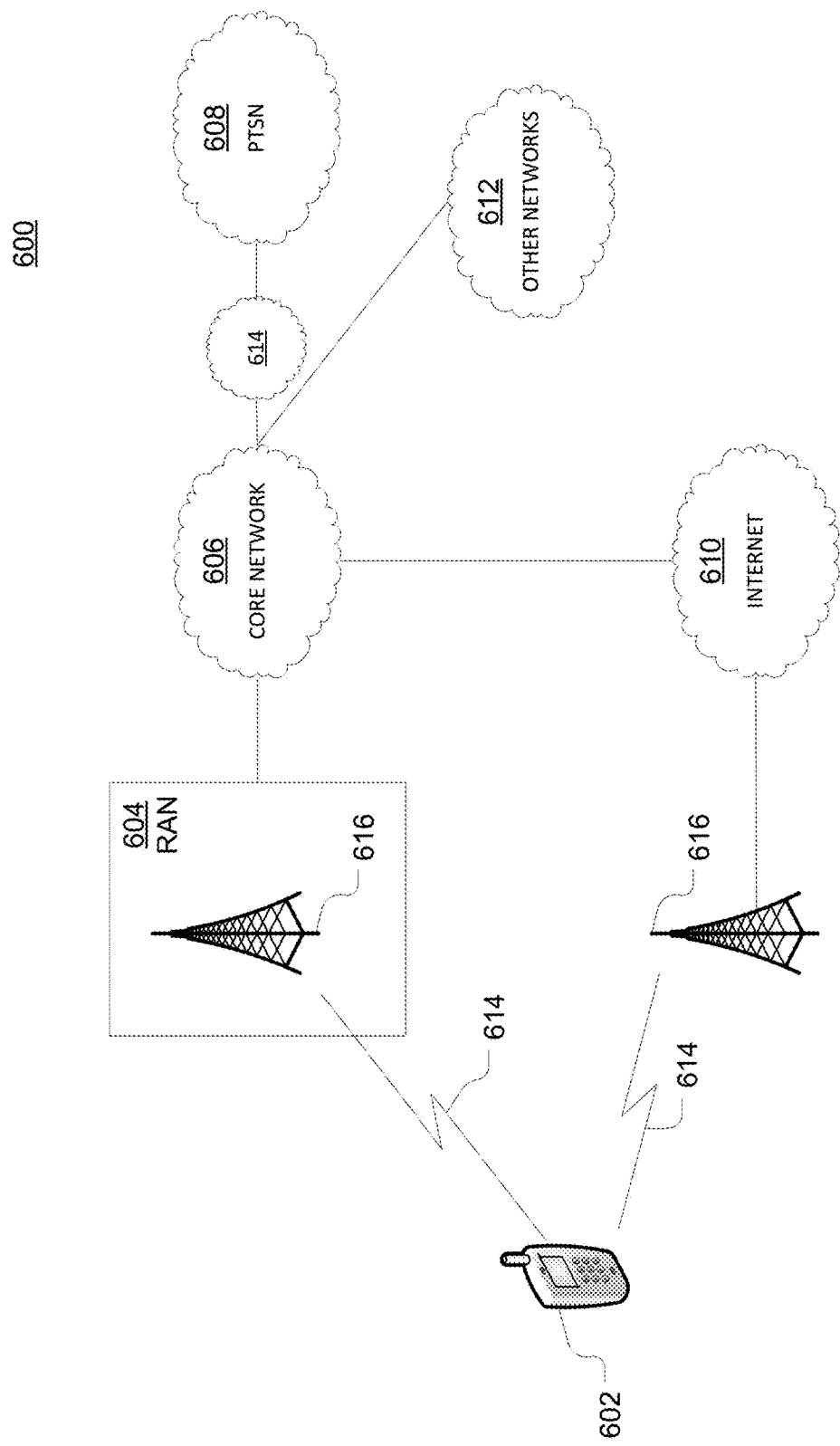
FIG. 8 illustrates an exemplary telecommunications system in which the disclosed methods and processes may be implemented.

As shown in FIG. 8, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise device 101, a mobile device, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 8, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 8, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which on demand adjustment of group communications can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—on demand adjustment of group communications—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A network device comprising:
   a processor; and
   a memory coupled with the processor, the memory comprising executable instructions stored thereon that when executed by the processor cause the processor to effectuate operations comprising:
      receiving a plurality of performance indicators associated with a plurality of communication sessions between a plurality of devices, wherein the plurality of communication sessions is with a virtual machine on the network device, wherein the plurality of performance indicators comprise a first plurality of performance indicators of a first communication session and a second plurality of performance indicators of a second communication session, wherein the plurality of communication sessions comprise the first communication session and the second communication session,
         wherein the plurality of performance indicators is calculated using one or more performance tests for communication sessions or the plurality of devices, and
         wherein the plurality of performance indicators comprises processor speed of the plurality of devices, battery performance of the plurality of devices, or reliability of the plurality of devices;
      based on a performance indicator of the plurality of performance indicators being outside of a threshold, determining performance indicators for each of a plurality of alternate network devices connected with the network device,
         wherein the threshold is a predetermined difference between at least a first performance indicator of the first communication session of the plurality of communication sessions and a second performance indicator of the second communication session of the plurality of communication sessions,
         wherein the performance indicators for each of the plurality of alternate network devices are calculated using one or more performance tests for the plurality of alternate network devices or communication sessions between the plurality of alternate network devices and the plurality of devices, and
         wherein the performance indicators for each of the plurality of alternate network devices comprise processor speed of each of the plurality of alternate network devices, battery performance of each of the plurality of alternate network devices, or reliability of each of the plurality of alternate network devices;
      based on the performance indicators for each of the plurality of alternate network devices connected with the network device, determining an alternate network device from the plurality of alternate network devices to which to relocate the virtual machine such that at least the first plurality of performance indicators of the first communication session of the plurality of communication sessions and the second plurality of performance indicators of the second communication session of the plurality of communication sessions are substantially equalized; and
      transferring the virtual machine to the alternate network device.

2. The network device of claim 1, wherein the plurality of communication sessions uses internet telephony.

3. The network device of claim 1, wherein the plurality of communication sessions streams live television.

4. The network device of claim 1, wherein the plurality of communication sessions streams a movie.

5. The network device of claim 1, wherein the virtual machine is for interactive gaming, and
   wherein the operations further comprise pausing gameplay by suspension of an image of an instance of the interactive gaming in order to enable a similar gameplay instance of the transferred virtual machine to the alternate network device.

6. The network device of claim 1, wherein the plurality of performance indicators further comprises memory availability of the plurality of devices.

7. A method comprising:
   receiving a plurality of performance indicators associated with a plurality of communication sessions between a plurality of devices, wherein the plurality of communication sessions is with a virtual machine on a network device, wherein the plurality of performance indicators comprise a first plurality of performance indicators of a first communication session and a second plurality of performance indicators of a second communication session, wherein the plurality of communication sessions comprise the first communication session and the second communication session,
      wherein the plurality of performance indicators is calculated using one or more performance tests for communication sessions or the plurality of devices, and
      wherein the plurality of performance indicators comprises processor speed of the plurality of devices, battery performance of the plurality of devices, or reliability of the plurality of devices;
   based on a performance indicator of the plurality of performance indicators being outside of a threshold, determining performance indicators for each of a plurality of alternate network devices connected with the network device,
      wherein the threshold is a predetermined difference between at least a first performance indicator of the first communication session of the plurality of communication sessions and a second performance indicator of the second communication session of the plurality of communication sessions,
      wherein the performance indicators for each of the plurality of alternate network devices are calculated using one or more performance tests for the plurality of alternate network devices or communication sessions between the plurality of alternate network devices and the plurality of devices, and
      wherein the performance indicators for each of the plurality of alternate network devices comprise processor speed of each of the plurality of alternate network devices, battery performance of each of the plurality of alternate network devices, or reliability of each of the plurality of alternate network devices;

based on the performance indicators for each of the plurality of alternate network devices connected with the network device, determining an alternate network device from the plurality of alternate network devices to which to relocate the virtual machine such that at least the first plurality of performance indicators of the first communication session of the plurality of communication sessions and the second plurality of performance indicators of the second communication session of the plurality of communication sessions are substantially equalized; and transferring the virtual machine to the alternate network device.

8. The method of claim 7, wherein the plurality of performance indicators comprises processor speed of the plurality devices.

9. The method of claim 7, wherein the plurality of performance indicators comprises battery performance of the plurality of devices.

10. The method of claim 7, wherein the plurality of performance indicators comprises reliability of the plurality of devices.

11. The method of claim 7, wherein the plurality of performance indicators comprises processor speed of the plurality of devices and reliability of the plurality of devices.

12. A computer readable storage medium storing computer executable instructions that when executed by a computing device cause the computing device to effectuate operations comprising:

receiving a plurality of performance indicators associated with a plurality of communication sessions between a plurality of devices, wherein the plurality of communication sessions is with a virtual machine on a network device, wherein the plurality of performance indicators comprise a first plurality of performance indicators of a first communication session and a second plurality of performance indicators of a second communication session, wherein the plurality of communication sessions comprise the first communication session and the second communication session, wherein the plurality of performance indicators is calculated using one or more performance tests for communication sessions or the plurality of devices, and wherein the plurality of performance indicators comprises processor speed of the plurality of devices, battery performance of the plurality of devices, or reliability of the plurality of devices;

based on a performance indicator of the plurality of performance indicators being outside of a threshold, determining performance indicators for each of a plurality of alternate network devices connected with the network device, wherein the threshold is a predetermined difference between at least a first performance indicator of the first communication session of the plurality of communication sessions and a second performance indicator of the second communication session of the plurality of communication sessions, wherein the performance indicators for each of the plurality of alternate network devices are calculated using one or more performance tests for the plurality of alternate network devices or communication sessions between the plurality of alternate network devices and the plurality of devices, and wherein the performance indicators for each of the plurality of alternate network devices comprise processor speed of each of the plurality of alternate network devices, battery performance of each of the plurality of alternate network devices, or reliability of each of the plurality of alternate network devices;

based on the performance indicators for each of the plurality of alternate network devices connected with the network device, determining an alternate network device from the plurality of alternate network devices to which to relocate the virtual machine such that at least the first plurality of performance indicators of the first communication session of the plurality of communication sessions and the second plurality of performance indicators of the second communication session of the plurality of communication sessions are substantially equalized; and transferring the virtual machine to the alternate network device.

13. The computer readable storage medium of claim 12, wherein the virtual machine is for an interactive real-time video fitness that comprises yoga or cycling.

14. The computer readable storage medium of claim 12, wherein the plurality of performance indicators comprises processor speed of the plurality of devices.

15. The computer readable storage medium of claim 12, wherein the plurality of performance indicators comprises battery performance of the plurality of devices.

16. The computer readable storage medium of claim 12, wherein the plurality of performance indicators comprises reliability of the plurality of devices.

17. The computer readable storage medium of claim 12, wherein the plurality of performance indicators comprises processor speed of the plurality of devices and reliability of the plurality of devices.

18. The network device of claim 1, wherein the plurality of communication sessions is for interactive real-time video fitness.

19. The method of claim 7, wherein the plurality of performance indicators comprises memory availability of the plurality of devices.

20. The network device of claim 1, the operations further comprising:

determining, based on an anticipated performance of the virtual machine, a cost to move the virtual machine on the network device to each of the plurality of alternate network devices; and based on the cost to move the virtual machine on the network device to each of the plurality of alternate network devices and the performance indicators for each of the plurality of alternate network devices connected with the network device, determining another alternate network device from the plurality of alternate network devices to which to relocate the virtual machine.

* * * * *